3,086,622
HYDRAULIC SHOCK ABSORBER WITH COMPRESSION STOP AND HYDRAULIC LOCK
Harold E. Schultze, Dayton, Ohio, assignor to General Motors Corporation, Detroit, Mich., a corporation of Delaware
Filed Mar. 13, 1961, Ser. No. 95,186
9 Claims. (Cl. 188—88)

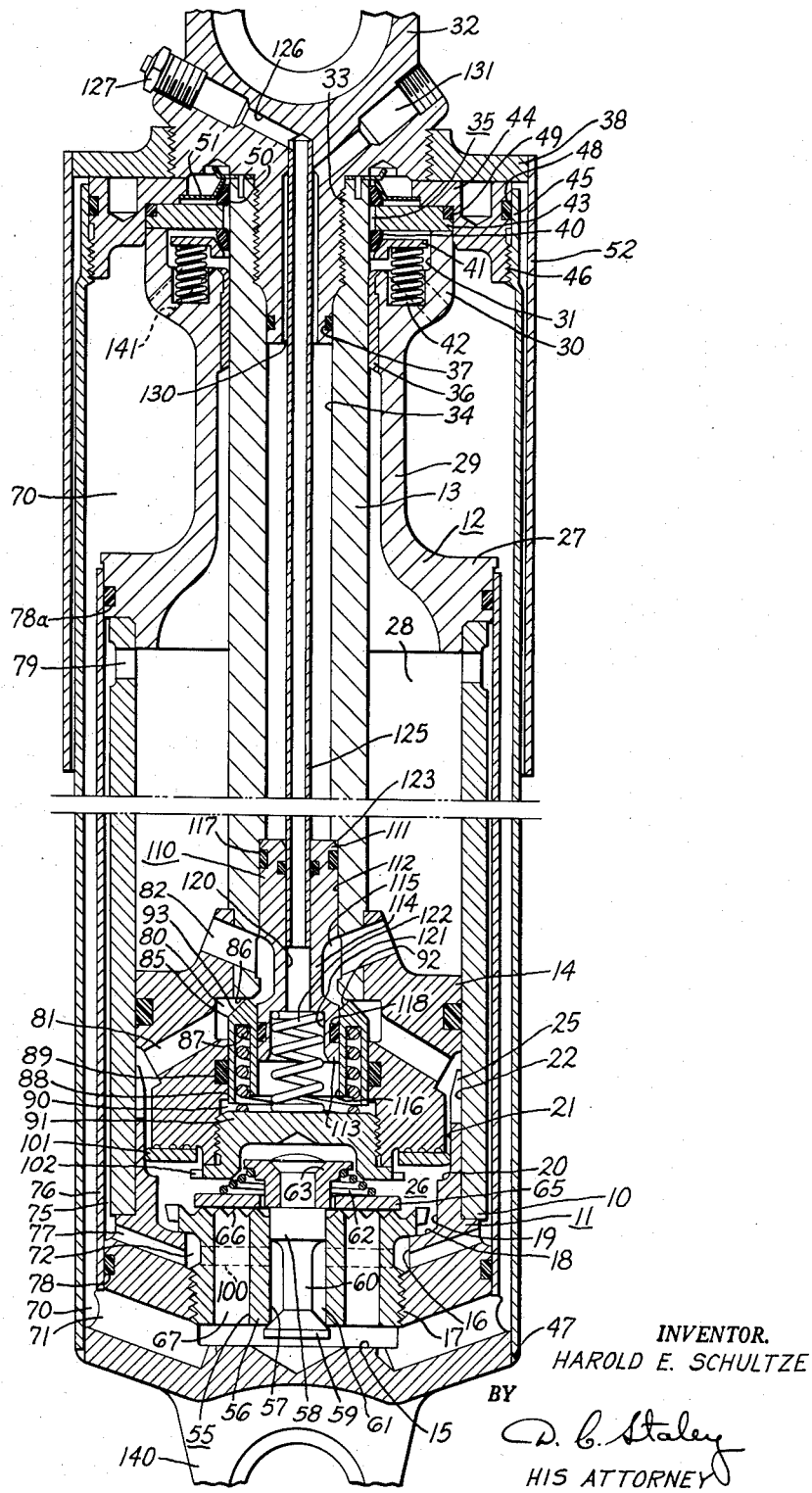
April 23, 1963    H. E. SCHULTZE    3,086,622
HYDRAULIC SHOCK ABSORBER WITH COMPRESSION
STOP AND HYDRAULIC LOCK
Filed March 13, 1961
INVENTOR.
HAROLD E. SCHULTZE
BY
HIS ATTORNEY

United States Patent Office 3,086,622
Patented Apr. 23, 1963

This invention relates to a direct-acting type shock absorber incorporating a piston reciprocable in a pressure cylinder, the shock absorber being adapted to control relative movement between the sprung mass and the unsprung mass of a vehicle.

An object of the invention is to provide a direct-acting type shock absorber that incorporates a valve means on the piston of the shock absorbing mechanism adapted to be actuated when the piston approaches the end of its compression stroke to hydraulically lock the piston against movement as the end of the compression stroke is reached by entrapment of hydraulic fluid between the piston and the end of the pressure cylinder in which the piston operates, the valve means consisting of a disc member that slidably enters a reduced diameter portion of the pressure cylinder as the piston approaches the end of the pressure cylinder during the compresison stroke, the shock absorbing device also including a pressure operated valve member actuated by a pressure source remote from the shock absorber to close off flow of hydraulic fluid between opposite sides of the piston between the compression chamber and the rebound chamber of the pressure cylinder in which the piston operates to effect a locking of the hydraulic fluid by prevention of the interflow between the compression and rebound chambers and thereby hydraulically lock the piston in any specific position in the pressure cylinder, this latter feature being accomplished by means of a piston valve member reciprocable in the piston of the shock absorber to close off a passage that connects the compression chamber with the rebound chamber of the shock absorber.

Further objects and advantages of the present invention will be apparent from the following description, reference being had to the accompanying drawings wherein a preferred embodiment of the present invention is clearly shown.

The direct-acting shock absorber of this invention, as shown in the drawing, consists of a pressure cylinder 10 closed at one end by a fitting member 11 and at the opposite end by a fitting member 12 through which a rod member 13 extends on the lower end of which there is carried a piston 14 which reciprocates in the pressure cylinder 10.

The lower fitting member 11 has a main body portion provided with a chamber recess 15 that includes the axial bore 16 having a threaded wall portion 17. The bore 16 terminates in a radial face 18 that forms the bottom wall portion of a slightly larger recess chamber 19 that in turn terminates in a radial shoulder 20 forming a somewhat slightly larger recess chamber wall 21 that extends axially parallel to the cylinder wall 22 of the pressure cylinder 10. The wall 21 has one or more longitudinally extending restriction passages 25 for purposes hereinafter described.

The lower end of the pressure cylinder 10 seats on the outer periphery of the body of the fitting 11, as shown in the drawing, so that the fitting 11 closes the lower end of the pressure cylinder and forms with the piston 14 a compression chamber 26 between the piston and the wall 11.

The upper end of the pressure cylinder 10 seats in a flanged portion 27 of the fitting member 12 and forms with the fitting member 12 a rebound chamber 28. The fitting member 12 has a reduced diameter portion 29 that terminates at its upper end in an annular enlarged portion 30 that has a recess chamber 31 for a rod seal structure 35.

The rod 13 that extends through the fitting member 12 has a rod guide 36 in the fitting member 12, the upper end of the rod 13 carrying a mounting fitting 32 by which the rod is attached to a movable part of the vehicle with which it is to be associated. The fitting 32 is threadedly received in the upper end of the rod 13 by the threaded connection 33, the rod 13 having the axial bore 34. An O-ring seal 37 is placed between the fitting 32 and the rod 13 to prevent fluid loss through the thread connection 33.

The rod seal 35 consists of a Teflon ring member 40 held in engagement with the rod 13 by a retainer member 41 urged against the member 40 by a plurality of compression springs 42, the member 40 seating against a ring 43 that is held on the upper end of the enlarged portion 30 of the fitting 12 by a retaining ring 44 which is threadedly held within the reservoir tube 45 by a thread connection 46, the lower end of the reservoir tube 45 having a welded connection 47 with the fitting member 11 at the lower end of the shock absorber. An O-ring seal 48 at the upper end of the reservoir tube 45 prevents loss of fluid through the thread connection 46 and an O-ring seal 49 between the ring 44 and the ring 43 prevents loss of fluid between these two members.

The seal structure 35 includes an outer Teflon ring 50 held against the rod 13 by means of a spring member 51 to prevent entry of dirt into the seal structure.

A dust tube 52 surrounds the reservoir tube 45 and is secured to a fitting 38 that threadedly connects to the fitting 32.

The lower fitting member 11 that closes the end of the compression chamber 26 contains a valve structure 55 received into the threaded connection 17 in the recess chamber 15.

The valve structure 55 comprises a body member 56 having an axial bore 57 that receives a plug valve 58 having a valve head 59 seating on the lower end of the bore 57 and a reduced diameter valve stem portion 60 that forms a chamber 61 between the plug valve 58 and the bore 57. The valve head 59 is held in closed position as shown in the drawing by a compression spring 62 that seats between the head portion 63 on the upper end of the plug valve 58 and a disc valve member 65 engaging the valve seat 66.

The disc valve 65 closes a series of passages 67 that connect the compression chamber 26 with the chamber recess 15 which in turn is connected with the reservoir chamber 70 by one or more passages 71, the disc valve 65 normally closing the ports 67 against the flow of hydraulic fluid from the compression chamber 26. The chamber space 61 in the axial bore 57 of the valve structure 55 is connected through one or more passages 100 with a chamber space 72 between the outer periphery of the body of the valve structure and the bore 16 in the fitting 11, which chamber space 72 is in turn connected with a chamber space 75 provided between the pressure cylinder 10 and a cylinder sleeve 76 in spaced relationship around the pressure cylinder 10 by means of one or more passages 77. The sleeve 76 has its opposite ends engaging the fittings 11 and 12 respectively, O-ring seals 78 and 78a preventing loss of fluid pressure from the chamber space 75. The chamber space 75 is connected with the rebound chamber 28 by one or more ports 79.

The piston 14 of the shock absorber has an internal chamber 80, the piston including passages 81 that connect the internal chamber 80 with the compression chamber 26 and additional passages 82 that connect the internal chamber 80 with the rebound chamber 28. The piston valve member 85 is seated on the end wall 86 of the chamber 80 by means of a compression spring 87 normally to prevent flow of hydraulic fluid between the compression and rebound chambers 26 and 28. The piston valve 85 is slidable in a bore 88 in the piston 14 and an O-ring seal 89 is provided to prevent loss of fluid into the chamber 90 within the piston valve 85. The chamber 90 is closed by a plug member 91.

The piston valve 85 has an annular surface 92 that is exposed to the fluid pressure in the rebound chamber to urge the piston valve to open position on the rebound stroke and also has a surface 93 that is exposed to fluid pressure in the compression chamber 26 to open the valve during the compression stroke of the piston 14. Thus the one valve 85 serves to control flow of fluid between the compression and rebound chambers on both compression and rebound stroke of the piston 14.

In the operation of the shock absorber thus far described, on the compression stroke of the piston 14, that is movement of the piston toward the valve structure 55 forming the valved end of the compression chamber, fluid under pressure in the compression chamber will be effective on the valve 85 to open the valve for flow of hydraulic fluid through the passages 81 and 82 into the rebound chamber 28 and thence through passage 79 into the chamber space 75 between the pressure cylinder 10 and the sleeve 76 and thence into the passage 77, chamber space 72, passage 100 into chamber space 61 within the bore 57 of the valve structure 55. When the fluid is placed under pressure in the compression chamber 26 the valve 58 will be moved downwardly to separate the valve head 59 from its seat and thereby allow the fluid under pressure to be displaced from the compression chamber 26 through the aforementioned series of passages, chambers and chamber spaces into the chamber 15 and thence into passage 71 into the reservoir space 70.

On rebound stroke of the piston 14, that is on movement of the piston away from the valve structure 55 forming the valved end of the compression chamber, the fluid under pressure in the chamber 28 will be effective through the port 79 and into the chamber space 75 and thence through port 77 and chamber space 72 into port 100 and thence into the chamber space 61 around the plug valve 58. But since the chamber space 61 exposes equal areas of the plug valve to the pressure in the chamber space, the valve will remain closed so that no fluid under pressure will flow through the plug valve at this time. Rather the pressure fluid in the chamber space 28 will be effective on the surface 92 of the piston valve 85 to open the valve and allow fluid under pressure to pass through passage 82 and passage 81 into the compression chamber 26. However, since insufficient fluid is available to fill the compression chamber 26 on the rebound stroke of the piston 14, additional fluid will be supplied from the reservoir space 70 through the passage 71 and the passage 67 with the disc valve 65 opening against the light spring 62 to allow substantially free flow of fluid from the reservoir space 70 into the compression chamber 26.

Under conditions of a severe compression stroke with the piston 14 approaching the valved end of the compression chamber 26, it is desirable that the movement of the piston be highly resisted in the end portion of its compression stroke. To accomplish this result, there is provided a compression stop control valve that comprises the disc valve member 101 and a reduced diameter portion 21 of the compression chamber 26. The disc valve member 101 is held in its position on the compression side of the piston 14 by means of one or more stop fingers 102 provided on the plug 91. The peripheral edge of the disc valve 101 is adapted to slidably enter the bore 21 of the axial chambered wall 21 so that when the disc valve is seated on the piston 14, as shown in the drawing, with the peripheral edge thereof engaging the wall 21 of the reduced diameter portion of the compression chamber 26, there will be a substantial entrapment of hydraulic fluid in the compression chamber between the piston 14 and the valved end wall of the compression chamber. This locking of the hydraulic fluid in the chamber near the end of the compression stroke highly resists movement of the piston at the end of the compression stroke to prevent the sprung mass of the vehicle from striking the unsprung mass.

To allow the compression control stop to be rendered gradually effective, the resistance passages 25 heretofore mentioned in the wall portion 21 are effective as the disc valve 101 moves downwardly into the reduced diameter portion 21 of the compression chamber to gradually increase the resistance to flow of hydraulic fluid from the compression chamber 26 until the edge periphery of the disc valve 101 passes beyond the lower ends of the resistance passages 25 whereupon substantially complete entrapment of the hydraulic fluid is obtained between the piston 14 and the valve end wall of the compression chamber.

On rebound movement of the piston, it is essential that hydraulic fluid be allowed to flow immediately into the compression chamber from the rebound chamber so that when piston 14 begins its upward movement away from the valved end of the compression chamber, the disc valve 101 will leave its seat on the compression side of the piston 14 and engage the stop lugs 102 so that hydraulic fluid can then pass across the top of the valve member 101 and through passages between the disc valve 101 and the piston 14 to allow for substantially immediate flow of hydraulic fluid from the rebound chamber 28 into the compression chamber 26 to bypass the disc valve 101 at the initiation of the rebound stroke 14.

Under certain conditions of operation of the vehicle, it is desirable to provide substantially complete rigidity between the sprung mass and the unsprung mass of the vehicle. This is accomplished in this invention by means of a piston valve member 110 that has a piston portion 111 slidably received in a cylinder bore 112 that is an enlargement of the axial bore 34 in the rod 13. The piston portion 111 is connected with a second piston portion 113 by means of a reduced diameter stem portion 114, the reduced diameter portion 114 cooperating with the cylinder bore 112 to form an annular chamber 115 that communicates with the passage 82 as well as with the internal chamber 80 in the piston 14.

The piston portion 114 is slidably received in an axial bore 116 in the piston valve 85 so that the piston 110 and the piston valve 85 can move independently of one another. O-ring seals 117 and 118 are provided around the piston portions 111 and 113 respectively.

The piston valve member 110 has an axial bore 120 that communicates with a chamber 121 in the piston portion 113, a compression spring 122 urging the piston member 110 to the position shown in the drawing against the stop shoulder 123. The spring 122 thus normally urges the piston member 110 to a position in which the fluid flow passage comprising the passage 82, the annular chamber 115 and the internal chamber 80 in the piston 14 are in normal flow communication for interflow of hydraulic fluid between the rebound chamber 28 and the compression chamber 26.

The bore 120 in the piston member 110 receives a pipe 125 that has its upper end extending into the fitting 32 and connects with a passage 126 that has a pressure release vent valve 127 in the end thereof so that atmospheric air pressure can stand in the vent passage 126 and the vent pipe 125 to prevent locking of hydraulic fluid in the chamber 90 in the event of any leakage of fluid into this chamber and provide for breathing action within the chamber 90 when the piston valving 110 is moved to a second position which closes the passage 82.

The axial bore 34 in the rod 13 connects with an axial bore 130 in the fitting 32 which in turn connects with a passage 131 by which fluid under pressure, either air or liquid, can be admitted into the bore 34 in the rod 13 to urge the piston valve member 110 downwardly against the force effect of the compression spring 122 and position the piston portion 111 across the port 82 and thereby cut off hydraulic fluid communication between the rebound chamber 28 and the compression chamber 26. When this occurs, and hydraulic fluid is prevented from interflow between the chambers, there is a hydraulic lock produced in the respective rebound and compression chambers which prevents movement of the piston 14 in either direction in the pressure cylinder 10. Such action of the placement of the piston 110 across the port 82 renders the hydraulic shock absorber device substantially rigid to retain the sprung mass of the vehicle relatively rigid with respect to the unsprung mass. Upon release of fluid pressure from the bore 34 in the rod, 13 the spring 122 will reposition the piston valve 110 in the position shown in the drawing to reopen the port 82 and again establish fluid communication between the rebound and compression chambers for normal shock absorber action of the device.

The lower fitting 11 carries a mounting element 140. The seal chamber 31 has a port 141 venting the same into the reservoir chamber 70.

While the embodiment of the present invention as herein disclosed constitutes a preferred form, it is to be understood that other forms might be adopted.

What is claimed is as follows:

1. In a hydraulic shock absorber, the combination of, a pressure cylinder, a piston reciprocable in said cylinder and dividing the same into a compression chamber and a rebound chamber, said piston being carried on one end of rod means extending through one end of said cylinder, the opposite end of said cylinder including valve means providing for discharge of hydraulic fluid from said compression chamber and return of hydraulic fluid thereto, said piston having an internal chamber and including passage means connecting said internal chamber with said rebound chamber and additional passage means connecting said internal chamber with said compression chamber, valve means in said internal chamber normally closing against fluid interflow between said rebound and compression chambers and responsive to fluid pressure in the respective rebound and compression chambers to open for fluid interflow therebetween, and a second valve means in said internal chamber movable to a position to close against fluid interflow between said rebound chamber and said internal chamber, said piston including a third valve means movable to a position to close against fluid interflow between said compression chamber and said internal chamber.

2. A hydraulic shock absorber constructed and arranged in accordance with claim 1 in which said third valve means includes a reduced inner diameter portion of said pressure cylinder adjacent the valved end of the pressure cylinder and a disc member on said piston slidable within said reduced diameter portion as said piston approaches said valved end of said cylinder to effect thereby entrapment of hydraulic fluid between said valved end and said piston to hydraulically stop movement of said piston toward said valved end.

3. In a hydraulic shock absorber, the combination of, a pressure cylinder, a piston reciprocable in said cylinder and dividing the same into a compression chamber and a rebound chamber, said piston being carried on one end of rod means extending through one end of said cylinder, the opposite end of said cylinder including valve means providing for discharge of hydraulic fluid from said compression chamber and return of hydraulic fluid thereto, said piston having an internal chamber and including passage means connecting said internal chamber with said rebound chamber and additional passage means connecting said internal chamber with said compression chamber, valve means in said internal chamber normally closing against fluid interflow between said rebound and compression chambers and responsive to fluid pressure in the respective rebound and compression chambers to open for fluid interflow therebetween, said first mentioned valve means comprising a piston member spring urged to close against a wall of said internal chamber to seat thereon and close thereby fluid communication between said rebound chamber and said compression chamber, and a second valve means in said internal chamber movable to a position to close against fluid interflow between said rebound chamber and said internal chamber, said second valve means comprising a second piston spring urged to a position normally to open said passage means between said rebound chamber and said internal chamber, said rod having passage means therein for conducting fluid pressure to said second piston to move the same to close said passage means between said rebound chamber and said internal chamber thereby to cut off fluid flow in either direction between said rebound chamber and said compression chamber.

4. In a hydraulic shock absorber, the combination of, a pressure cylinder, a piston reciprocable in said cylinder and dividing the same into a compression chamber and a rebound chamber, said piston being carried on one end of rod means extending through one end of said cylinder, and opposite end of said cylinder including valve means providing for discharge of hydraulic fluid from said compression chamber and return of hydraulic fluid thereto, a sleeve member surrounding said pressure cylinder and spaced therefrom and in end closing engagement therewith to provide with the cylinder a part of passage means connecting with said rebound chamber for flow of hydraulic fluid from said rebound chamber to said valve means, said valve means being actuated by fluid pressure in the compression chamber to open during compression stroke of the piston in the pressure cylinder, wall means surrounding said pressure cylinder and sleeve member and spaced therefrom to provide a reservoir space for hydraulic fluid, said valved end of said pressure cylinder having passage means therein connecting said reservoir space with said valve means, said piston having an internal chamber and including passage means connecting said internal chamber with said rebound chamber and additional passage means connecting said internal chamber with said compression chamber, valve means in said internal chamber normally closing against fluid interflow between said rebound and compression chambers and responsive to fluid pressure in the respective rebound and compression chambers to open for fluid interflow therebetween, and a second valve means in said internal chamber movable to a position to close against fluid interflow between said fluid rebound chamber and said internal chamber thereby to lock said piston hydraulically against movement in either direction in said pressure cylinder, said piston including a third valve means movable to a position to close against fluid interflow between said compression chamber and said internal chamber to effect entrapment of hydraulic fluid between said piston and said valved end of said pressure cylinder and hydraulically prevent movement of said piston toward said valved end of said cylinder.

5. In a hydraulic shock absorber, the combination of, a pressure cylinder, a piston reciprocable in said cylinder and dividing the same into a compression chamber and a rebound chamber, said piston being carried on one end of rod means extending through one end of said cylinder, the opposite end of said cylinder including valve means providing for discharge of hydraulic fluid from said compression chamber and return of hydraulic fluid thereto, said piston having an internal chamber and including passage means connecting said internal chamber with said rebound chamber and additional passage means connecting said internal chamber with said compression chamber, valve means comprising a piston urged to close against an end wall of said internal chamber and seat thereon to resist thereby fluid interchange between said compression and rebound chambers and responsive to fluid pressure in the respective compression and rebound chambers to open for fluid interflow therebetween, said rod means having an axial bore therein, a piston member slidable in said bore and resiliently urged to a position to open said passage means between said rebound chamber and said internal chamber, said axial bore being connected with passage means for conducting fluid pressure thereto for acting against said piston member in said bore to move the same to a second position for closing said passage means between said rebound chamber and said internal chamber and hydraulically lock thereby said piston in said pressure chamber.

6. A hydraulic shock absorber constructed and arranged in accordance with claim 5 wherein said piston member in said axial bore includes a piston portion slidable in said piston member that comprises the aforesaid valve means and cooperating therewith to form a chamber within the said cooperating piston means, and means forming a vent passage to atmosphere from the said last mentioned chamber.

7. In a hydraulic shock absorber, the combination of, a pressure cylinder, a piston reciprocable in said cylinder and dividing the same into a compression chamber and a rebound chamber, said piston being carried on one end of rod means extending through one end of said cylinder, said piston having an internal chamber and including passage means connecting said internal chamber with said rebound chamber and additional passage connecting said internal chamber with said compression chamber, valve means in said internal chamber normally closing against fluid interflow between said rebound and compression chambers and responsive to fluid pressure in the respective rebound and compression chambers to open for fluid interflow therebetween, the opposite end of said cylinder including first valve means preventing discharge of hydraulic fluid directly from said compression chamber and responsive to fluid pressure in said compression chamber to open passage means connected with said rebound chamber for indirect discharge of fluid pressure from said compression chamber through said rebound chamber and second valve means for substantially free return of fluid to said compression chamber from a reservoir means, said piston including a valve means movable to a closed position when the piston approaches the said opposite end of said cylinder to close against fluid interflow between said compression chamber and said internal chamber for entrapment of fluid between said piston and said opposite end of said cylinder to hydraulically resist movement of said piston toward said opposite end of said cylinder.

8. In a hydraulic shock absorber, the combination of, a pressure cylinder, a piston reciprocable in said cylinder and dividing the same into a compression chamber and a rebound chamber, said piston being carried on one end of rod means extending through one end of said cylinder, said piston having an internal chamber and including passage means connecting said internal chamber with said rebound chamber and additional passage means connecting said internal chamber with said compression chamber, valve means in said internal chamber normally closing against fluid interflow between said rebound and compression chambers and responsive to fluid pressure in the respective rebound and compression chambers to open for fluid interflow therebetween, the opposite end of said cylinder including first valve means preventing discharge of hydraulic fluid directly from said compression chamber and responsive to fluid pressure in said compression chamber to open passage means connected with said rebound chamber for indirect discharge of fluid pressure from said compression chamber through said rebound chamber and second valve means for substantially free return of fluid to said compression chamber from a reservoir means, said piston including a disc valve member seating on the compression chamber end of said piston during compression stroke movement of said piston in said cylinder and movable into sliding engagement with a reduced diameter portion of said cylinder at the valved end of said cylinder to entrap thereby hydraulic fluid between said piston and said valved end of said cylinder to resist movement of said piston toward said valved end.

9. In a hydraulic shock absorber, the combination of, a pressure cylinder, a piston reciprocable in said cylinder and dividing the same into a compression chamber and a rebound chamber, said piston being carried on one end of rod means extending through one end of said cylinder, said piston having an internal chamber and including passage means connecting said internal chamber with said rebound chamber and additional passage means connecting said internal chamber with said compression chamber, valve means in said internal chamber normally closing against fluid interflow between said rebound and compression chambers and responsive to fluid pressure in the respective rebound and compression chambers to open for fluid interflow therebetween, the opposite end of said cylinder including first valve means preventing discharge of hydraulic fluid directly from said compression chamber and responsive to fluid pressure in said compression chamber to open passage means connected with said rebound chamber for indirect discharge of fluid pressure from said compression chamber through said rebound chamber and second valve means for substantially free return of fluid to said compression chamber from a reservoir means, said piston including a disc valve member seating on the compression chamber end of said piston during compression stroke movement of said piston in said cylinder and movable into sliding engagement with a reduced diameter portion of said cylinder at the valved end of said cylinder to entrap thereby hydraulic fluid between said piston and said valved end of said cylinder to resist movement of said piston toward said valved end, said disc valve member being unseated from said piston on initiation of rebound stroke movement of the piston to provide for substantially immediate flow of hydraulic fluid from said rebound chamber to said compression chamber.

References Cited in the file of this patent

UNITED STATES PATENTS

| | | |
|---|---|---|
| 2,606,630 | Rossman | Aug. 12, 1952 |
| 2,760,604 | Wyeth | Aug. 28, 1956 |
| 2,865,396 | Focht | Dec. 23, 1958 |
| 2,907,414 | Patriquin | Oct. 6, 1959 |
| 2,984,321 | Schultze | May 16, 1961 |

FOREIGN PATENTS

| | | |
|---|---|---|
| 677,176 | Great Britain | Aug. 13, 1952 |